US005206637A

United States Patent [19]

Warren

[11] Patent Number: 5,206,637

[45] Date of Patent: Apr. 27, 1993

[54] REMOVABLE FILE PROGRAMMING UNIT

[75] Inventor: Edward L. Warren, Spring Lake, Mich.

[73] Assignee: Meridian Incorporated, Spring Lake, Mich.

[21] Appl. No.: 648,967

[22] Filed: Jan. 31, 1991

[51] Int. Cl.[5] .................. G06F 7/04

[52] U.S. Cl. .................. 340/825.31; 340/825.35; 70/277; 312/222

[58] Field of Search .................. 340/825.31, 825.32, 340/825.34, 825.69, 825.72, 825.3, 825.33, 825.35; 312/222, 215; 70/277, 81, 82; 221/154; 235/382, 382.5; 361/172

[56] References Cited

U.S. PATENT DOCUMENTS

| | | | |
|---|---|---|---|
| Re. 33,873 | 4/1992 | Romano | 340/825.31 |
| 3,648,241 | 3/1972 | Naito et al. | 340/825.31 |
| 3,812,403 | 5/1974 | Gartner | 317/134 |
| 4,083,424 | 4/1978 | von den Stemmen et al. | 180/114 |
| 4,250,533 | 2/1981 | Nelson | 361/172 |
| 4,267,942 | 5/1981 | Wick, Jr. et al. | 312/209 |
| 4,635,053 | 1/1987 | Banks et al. | 340/825.31 |
| 4,677,284 | 6/1987 | Genest | 340/825.31 |
| 4,698,630 | 10/1987 | Ellsberg | 340/825.31 |
| 4,851,937 | 7/1989 | Sander | 70/277 |
| 4,866,661 | 9/1989 | de Prins | 235/385 |
| 4,967,576 | 11/1990 | Warfman | 70/277 |
| 5,083,122 | 1/1992 | Clark | 340/825.31 |

*Primary Examiner*—Donald J. Yusko
*Assistant Examiner*—Andrew Hill
*Attorney, Agent, or Firm*—Reising, Ethington, Barnard, Perry & Milton

[57] ABSTRACT

A removable programming unit (11) is connectable to a controller (40) of an electronic locking system (12) of a storage assembly (14) via a telephone cord (38). The removable programming unit (11) comprises a display (52) and a keyboard (54). Through the removable programming unit (11): new access codes used to gain access to the storage assembly (14) may be programmed into the electronic lock; existing access codes may be modified as to which storage units (18) may be accessed; or existing access codes may be deleted. All existing access codes are stored in the memory (92) of the controller (40). The removable programming unit (11) receives 12 V DC from the connection to the electronic lock (12) via an individual wire of the telephone cord (38).

13 Claims, 6 Drawing Sheets

REMOVABLE FILE PROGRAMMING UNIT

BACKGROUND ART

1. Field of the Invention

The subject invention relates to storage assemblies having electronic locks. More particularly, the subject invention relates to electronically programmable locking storage assemblies having limited and varying access.

2. Description of Related Art

As the size of a company grows, so does the need to limit the access of information only to those employees who have a need to use the information. The limitation of access helps to focus the employees on their particular tasks and increases the time needed to locate information when it is out of its storage location. In addition, limiting the access of information increases security of the information.

U.S. Ser. No. 505,037, a continuation-in-part of U.S. Ser. No. 303,949, filed on Feb. 1, 1989, is of the same inventorship and discloses an electronic interlock system for storage units such as file cabinets. The electronic interlock is a lock totally independent of any other file cabinet although it may have a port to allow electronic communication with a computer, such as a personal computer, exterior therefrom.

The prior art does not disclose an electronic lock used for office furniture wherein the programmable capabilities of the electronic lock are removable.

U.S. Pat. No. 4,083,424 to von den Stemmen et al, issued on Apr. 11, 1978, discloses a portable housing unit having keyboard for receiving codes, which are input by the user, to unlock the electronic lock of a vehicular cargo space. This portable housing unit does not, however, have any capability of programming new or existing codes into or out of the vehicular lock.

U.S. Pat. No. 3,812,403 to Gartner, issued on May 21, 1974 discloses an electronic locking system for a door comprising a door and a door jam. A removable push-button switch is inserted into the locking system and a locking sequence is transferred to the locking system. If the sequence matches, the door is unlocked. This system, however, does not disclose any ability to program the door locking system via the push button switch.

U.S. Pat. No. 4,250,533 to Nelson, issued on Feb. 10, 1981 discloses a security system having one programmable key. The key has a programmable read only memory chip (PROM), which has several codes therein. When the key is inserted into the security system, the PROM inductively transfers the codes in serial fashion ultimately into a shift register where the codes will be stored until they are moved to the compare logic to be compared with acceptable codes stored in a read-only memory chip (ROM). Although the key is programmable and is capable of holding a series of access codes, the key cannot program the security system by introducing new codes into the security system. This is evident from the fact that the security system stores the stored codes in a PROM chip, which is not programmable.

SUMMARY OF THE INVENTION AND ADVANTAGES

The subject invention is a storage assembly having an electronic lock. The storage assembly includes housing means defining an enclosure. The housing means is subdivided into a plurality of storage units to be supported by the housing means for movement between a closed condition and an open condition. Individual locking means are associated with each of the plurality of storage units. The individual locking means have a normally locked condition for independently locking each of the storage units in the closed condition and moveable to an unlocked position for independently allowing each of the plurality of storage units to move to the open condition. The subject invention further includes control means for controlling the locking means. The control means is connected to the housing means and stores a plurality of access codes, receives input codes and controls the individual locks by producing an unlock signal when the input code equals one of the plurality of access codes. The assembly is characterized by including removable programming means. The removable programming means is removably connectable with the control means for selectively altering the plurality of access codes stored therein. It is also disconnectable from the control means for removal to a remote site to prevent changing of the access codes.

The advantages brought forth by the subject invention include increasing the security of the storage units by removing the ability to program the control means from the storage assembly in addition to the reduction of cost by eliminating the need to hardwire one or more storage assemblies to one or more computers.

BRIEF DESCRIPTION OF THE DRAWINGS

Other advantages of the present invention will be readily appreciated as the same becomes better understood with reference to the following description when considered in connection with the accompanying drawings wherein.

DETAILED DESCRIPTION OF THE PREFERRED EMBODIMENT

Figure 1:
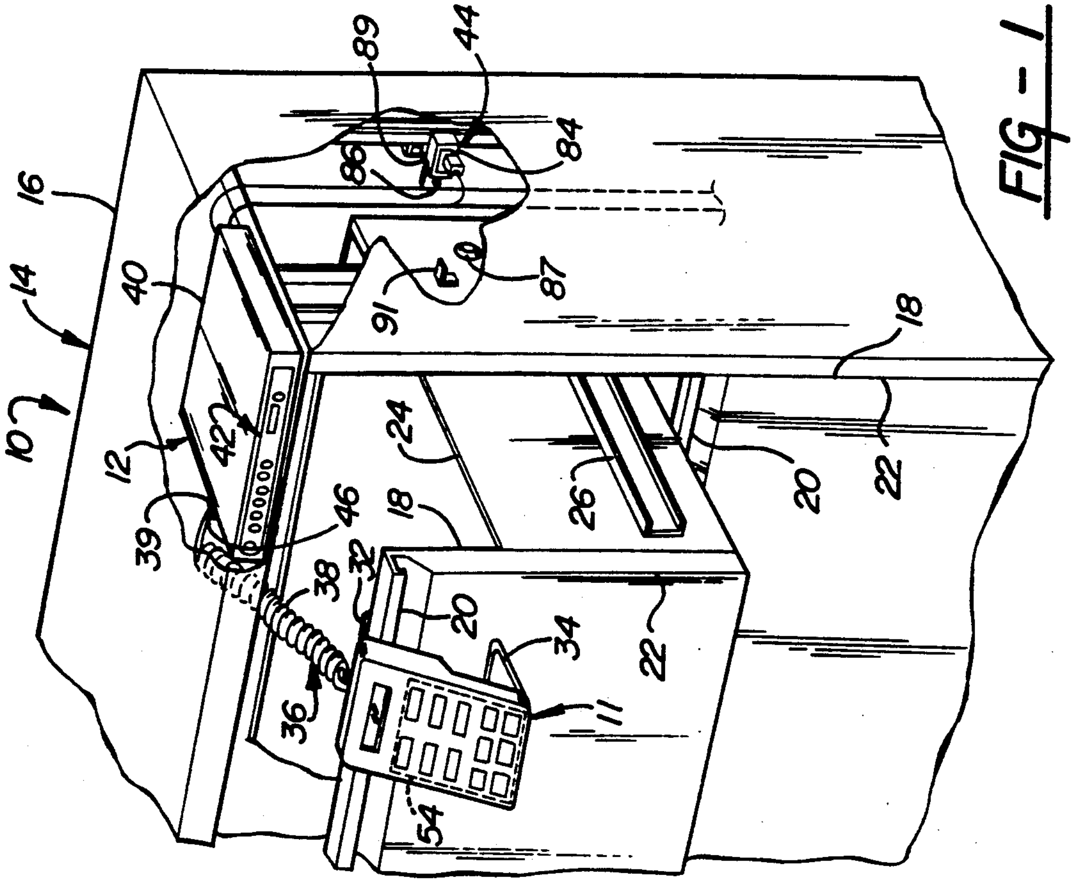
FIG. 1 is a perspective view of the preferred embodiment of the subject invention.

Referring to FIG. 1, the subject invention is generally shown at 10. The removable programming means 11 is designed to interface with an electronic lock, generally shown at 12, of a storage assembly 14. The subject invention 10 is an affordable means for accessing the memory of the electronic lock 12. The electronic lock 12 will be discussed in greater detail subsequently.

The storage assembly, generally indicated at 14, may be any type of furniture with the capacity to store items. In FIG. 1, the storage assembly 14 is shown to be a file cabinet. The file cabinet 14 includes a housing 16 which defines an enclosure. The enclosure is subdivided by storage units 18 wherein each storage unit 18, two fully shown, is moveable between a closed condition and an open condition; both conditions are represented by the top and bottom storage units 18, respectively. The storage units 18 may have handles 20 to aid in the opening of a storage unit 18 to its open condition. The storage units 18 also comprise a front 22, two side 24, bottom and back (neither shown) surfaces. The two side surfaces 24 have guides 26 that follow tracks (not shown) attached to the side surface of the housing 16. The storage units 16 are numbered from top to bottom in ascending order. For example, the top storage unit 18 is referred to as "one", the storage unit 18 second from the top will be referred to as "two", etc, the significance of which will be discussed subsequently.

The removable programming means 11 is seen clipped to the handle 20 of the storage unit 18 in the open condition in FIG. 1. A clip 32 is U-shaped to fit around the top of the front surface 22, thus allowing the operator the freedom of not having to hold the removeable programming means 10 while operating it.

The removable programming means 11 further includes retractable stand means 34 for positioning the removable programming means 10 away from the front surface 22 of the storage unit 18 to aid in the operation thereof. The retractable stand means 34 is a U-shaped piece of hard material, typically metal, with hinges (not shown) attaching the retractable stand means 34 to the back of the subject invention 10 for allowing rotation of the retractable stand means 34 out of the way to facilitate storage when the removable programming means 11 is not being used.

The removable programming means 11 further comprises a connection means, generally indicated at 36, for electronically connecting the removable programming means 11 to the electronic lock means 12. The connect means 36 comprises a long set of conductive wires 38 insulated from each other so each wire may act as a medium for the transmission of separate and distinct electrical signals. The long set of conductive wires 38 has a connection end 39 and is shown to resemble a standard long telephone cord 38 because it is inexpensive, readily available in the market place, and, most importantly, it is designed to perform exactly the same task as the long set of conductive wires 38. Of course, any type of medium of transmission may be used in place of the telephone cord 38 without adding anything inventive to the subject invention. Such substitutes may be systems utilizing acoustics, optics or radio waves.

The electronic lock 12 is shown in FIG. 1 to have control means 40, input means 42, and individual locking means 44 (two shown). The input means 42 is an alphanumeric keyboard 42. A connection port 46 is placed adjacent the alpha-numeric keyboard 42 and receives the connection end 39 of the long telephone cord 38. The connection port 46 transmits all information transmitted through the long telephone cord 38 by the removable programming means 10 to the control means 40. The electronic lock 12 will be discussed in more detail subsequently.

Figure 2:
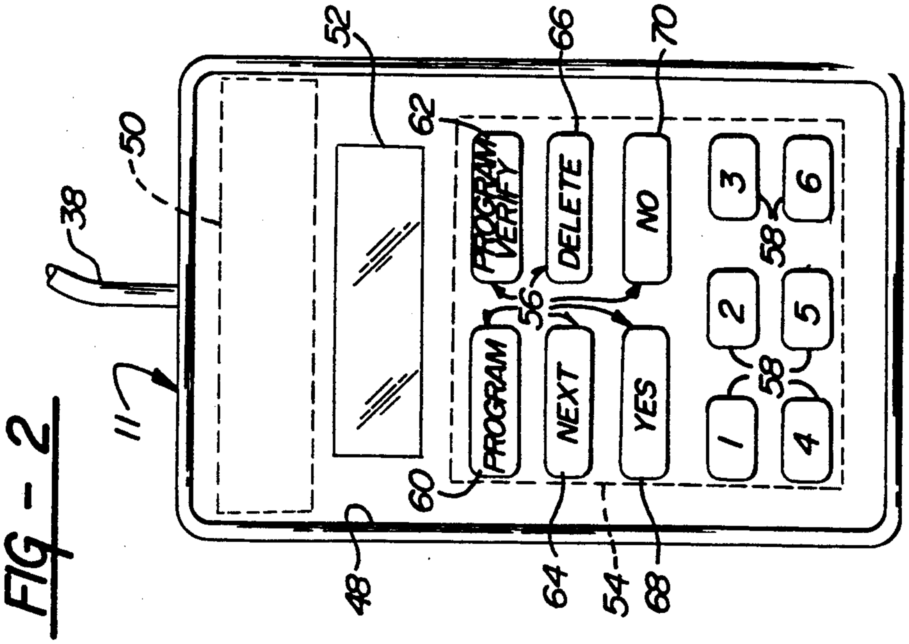
FIG. 2 is a plan view of the preferred embodiment of the removable programming means.

The removable programming means 11 may be seen in greater detail in FIG. 2. The removable programming means 11 is substantially rectangular in shape. The removable programming means 11 has a face side 48 subdivided into three (3) sections 50, 52, 54. The first section 50 is a flat empty space suitable for printed material thereon. The second section 52 is the area where the display exists. The display 52 is a standard liquid crystal display (LCD). Although the removable programming means 11 is designed to use LCD display #LM16255 produced by Sharp Incorporated, any suitable display may be used. The third section 54 of the subject invention 10 is a keyboard 54. The keyboard 54 comprises two different and distinct types of keys; the mode keys, generally indicated at 56, and the numerical keys 58. The mode keys 56 are six keys, each individually labelled "PROGRAM" 60, "PROGRAM VERIFY" 62, "NEXT" 64, "DELETE" 66, "YES" 68 and "NO" 70. The mode keys 56 determine what information is to be manipulated and how it is to be manipulated. The exact operations each mode key 56 performs when the operation of the subject invention 10 is discussed.

The numerical keys 58 consists of a 2×3 matrix of keys numbered by one (1) through six (6). The three functions of the numerical keys 58 are: (i) to input a security code to gain access to the control means 40; (ii) to alter the status of access codes by adding, deleting, or modifying the list of access codes stored by the control means 40; (iii) to input the storage units 18 that may be accessed by inputting the particular access code.

Figure 3:
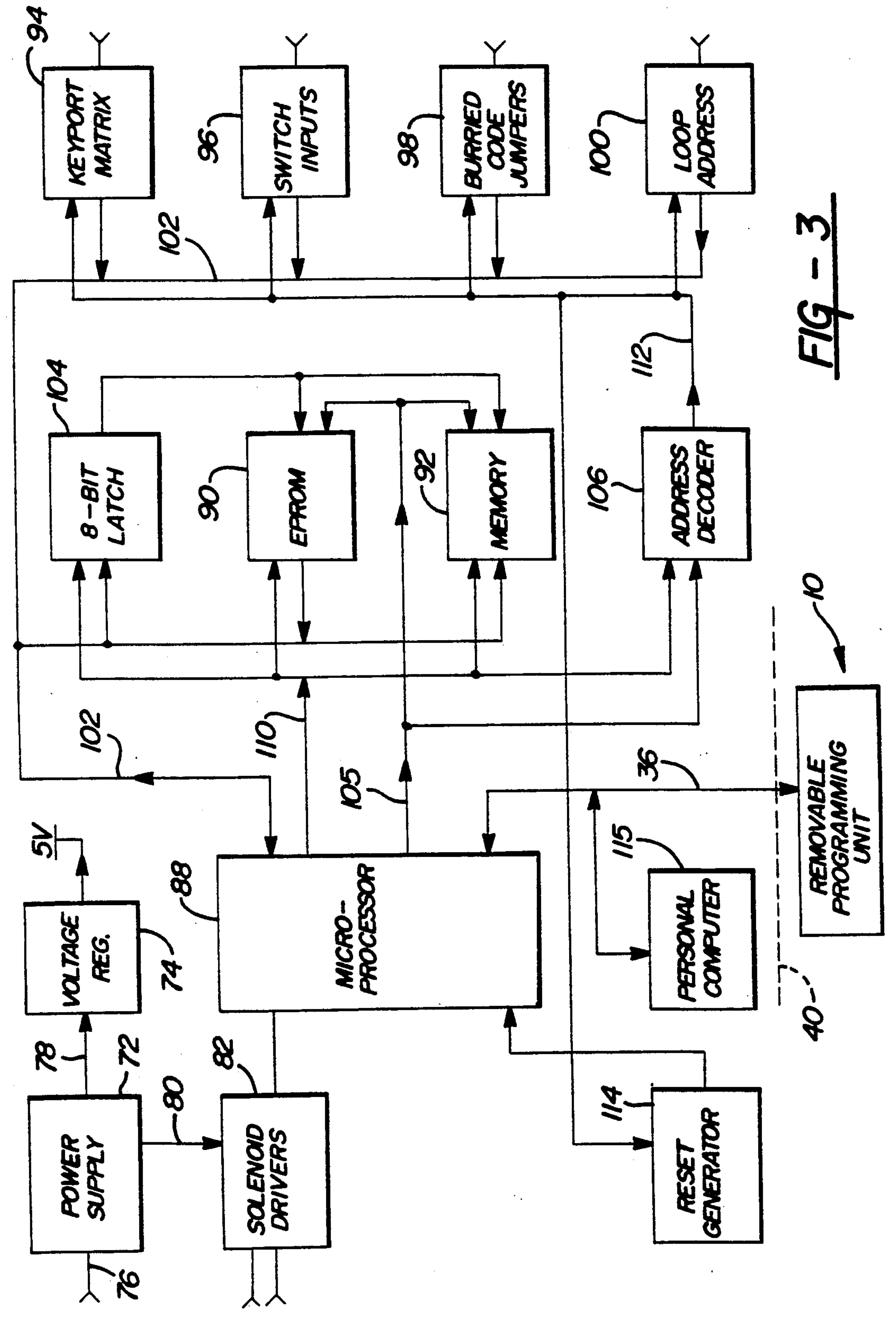
FIG. 3 is a block diagram of the removable programming means and the control means with the removable programming means connected thereto.

Turning to FIG. 3, the removable programming unit 11 and the control means 40 are shown in block diagram form. Additionally, the blocks representing the power supply 72 and voltage regulator 74 are shown.

The power supply 72 receives power from line 76 carrying current in one of two possible manners; a connection directly to a standard wall outlet or a connection from a dedicated power line wherein the dedicated power line is a part of wire harness used when more than one or a bank of file cabinets 14 are located in close proximity to one another. The power supply 72 supplies 12 volts DC along lines 78, 80 to the voltage regulator 74 and the solenoid drivers 82. The voltage regulator 74 supplies the remaining control means with 5 volts DC of electrical power. The solenoid driver 82 operates the individual locking means 44 which comprises individual solenoids 84, best seen in FIG. 1. The individual locking means 44, one pair associated with each storage unit 18, have a normally locked condition with the plunger 86 extended outwardly for independently locking each of the storage units 18 in the closed position and moveable to an unlocked condition with the plunger 86 retracted inwardly (seen in the storage unit 18 second from the top in FIG. 1) for independently allowing each of the plurality of storage units 18 to the open position.

The control means 40 further comprises a microprocessor 88. The microprocessor 88 is an 8-bit CMOS microcontroller and operates per the instructions, i.e. microcode, it receives from an external electronically programmable read only memory chip (EPROM) 90. The microprocessor 88 stores and retrieves the access codes and the storage units 18 assigned to that particular access code (hereinafter "combined code") in an external CMOS memory chip 92. The microprocessor 88 also compares the access codes and/or security code, depending on the current mode of operation, which are input via the keyboard 54 of the removable programming means 11 or by the input means 42 to the access codes and/or security code(s) in the CMOS memory chip 92. The CMOS memory chip 92 comprises 200 registers (not shown) which individually store each combined code therein and at least one register for a security code. The microprocessor 88 also controls four additional 8-bit input ports, they being the key port matrix 94 of the input means 42, the switch inputs 96, the buried code jumpers 98 and the loop address 100. When any of these four additional input ports 94, 96, 98, 100 are enabled, the information stored therein is placed on the 8-bit data bus 102 and sent to the microprocessor 88.

The low order 8-bit address bus is demultiplexed from the data bus with an 8-bit latch 104. This latch 104 stores the portion of the instruction cycle on the falling edge of the address latch enable control signal. This latched address is delivered to the EPROM chip 90 and the CMOS chip 92. The high order address bus 105 is output directly from the microprocessor 88 and delivered to the EPROM chip 90, the CMOS chip 92, and the address decode circuitry 106.

The address decode circuitry 106 decodes a high order address along with the data read control signal 110 from the microprocessor 88 and delivers a dedicated read signal 112 to each of the four 8-bit input ports 94, 96, 98, 100. A dedicated read signal 112 is also delivered to the reset generation circuitry 114 to continually interrupt the reset generation circuitry and prevent the resetting of the control means 40 during normal operation. The reset generation circuitry 114 resets all of the circuitry when a fault is detected.

The reset generation circuitry 114 will hold the control means 40 in reset condition during control means 40 power up and also disables the control means 40, with a reset, if the input voltage falls below a predetermined level. This prevents erroneous data from being written into the CMOS chip 92 during system power up and down. The reset generation circuitry 114 also contains a watchdog timer (not shown). If for some reason the microprocessor 88 program loses its place, the read signal will not occur during a regular interval and the watchdog timer will reset the system to normal operation. The reset generation circuitry 114 also performs the battery back-up function for the CMOS chip 92.

The control means 40 interfaces the removable programming means 11 via the connection means 36. A more complete description of the control means 40 is disclosed in a copending application, filed Oct. 17, 1990, (our reference: Meridian P-309), by the same inventor and assigned to the same assignee.

Figure 4:
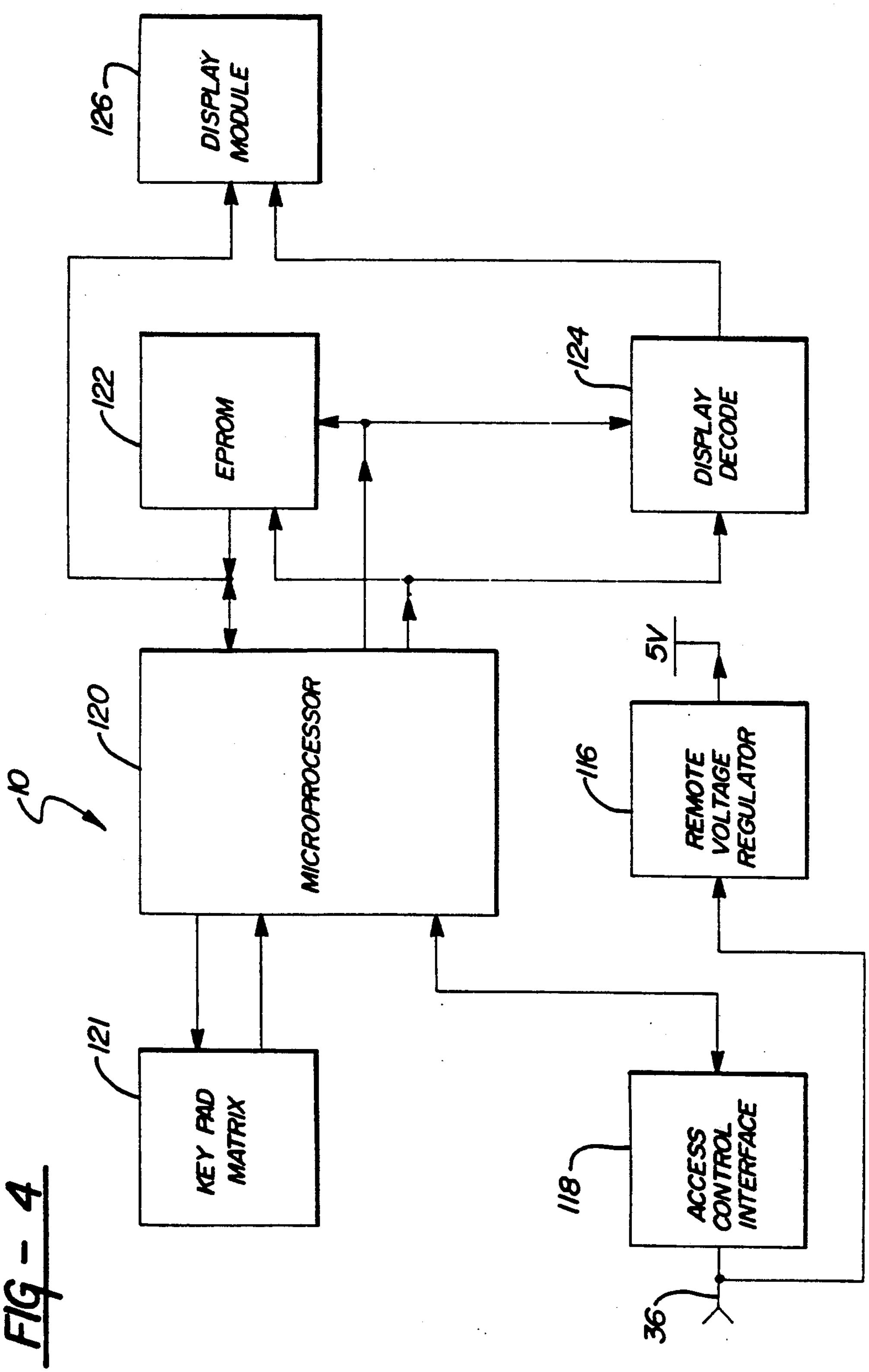
FIG. 4 is a block diagram of the removable programming means.

A block diagram of the electronic circuit of the removable programming means 11 is shown in FIG. 4. A remote voltage regulator 116 receives power from the long telephone cord 36 and supplies five volts DC to the rest of the removeable programming means 10. The access control interface 118 is also in electrical communication with the control means 40 via the long telephone cord 36. The access control interface 118 receives from and transmits to the control means 40 information in relation to the programming of the control means 40.

The access control interface 114 is in two-way communication with the microprocessor 120 of the removable programming means 11. The microprocessor 120 operates pursuant to the request made through the key pad matrix 121, which contains the mode 56 and numerical 58 keys, and the instruction it receives from the EPROM chip 122 located in the removable programming means 11. In addition, the microprocessor 120 operates the EPROM chip 122 using control signals in conjunction with the high order address bits. The microprocessor 120 also operates the display decoder 124 which, in turn, operates the display module 126. The display decoder 124 decodes the address range in which the display data can be written. This decoder 126 inputs high order address and data write signals from the microprocessor 120 and generates a display write signal which is interpreted by the display module 126.

Figure 5:
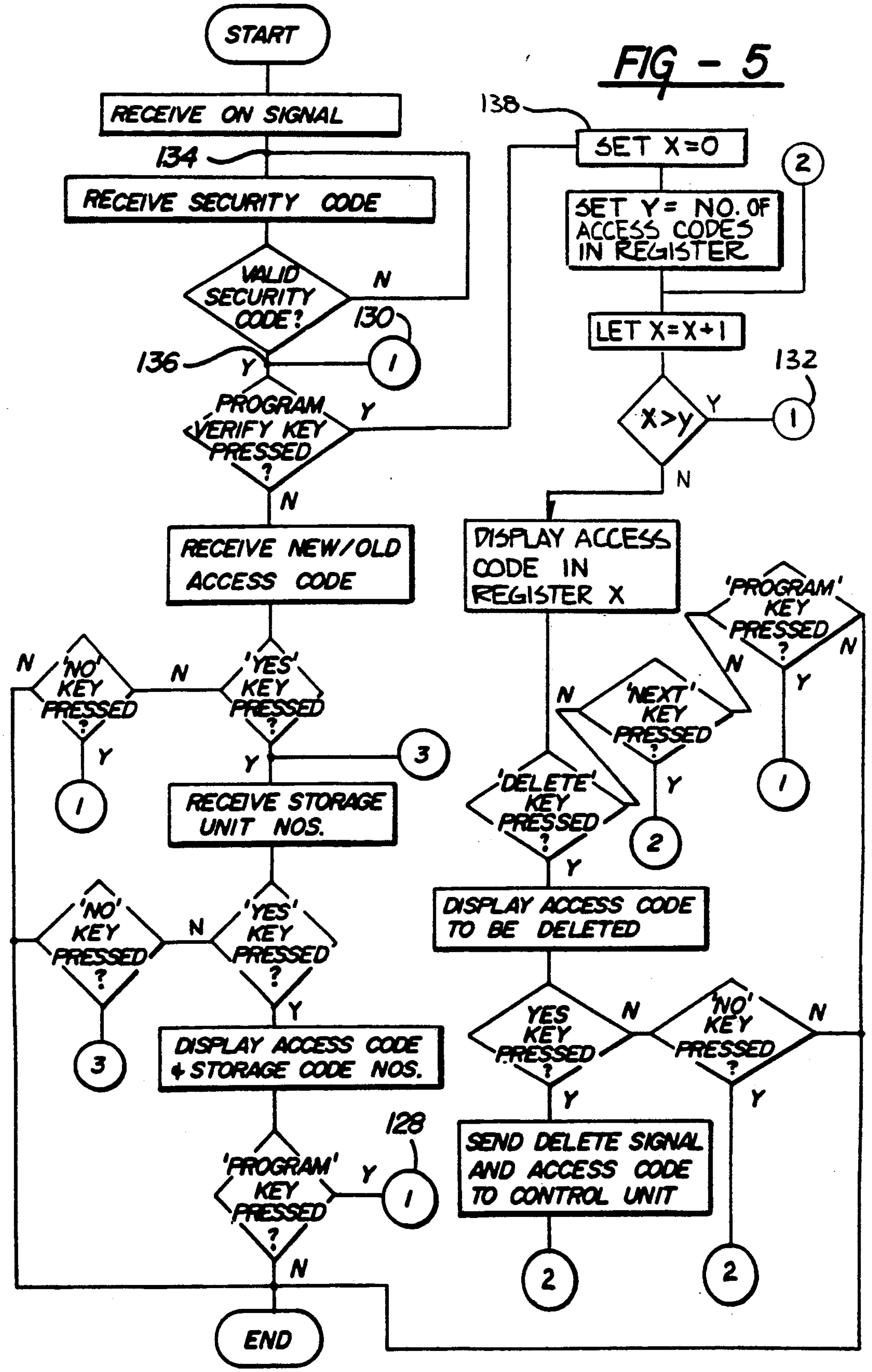
FIG. 5 is a flow chart of the microprocessor of the subject invention.

Turning to FIG. 5, a flow chart of the operations of the microprocessor 120 of the subject invention 10 is shown. When viewing the flow chart, connecting path numerals always connect with the highest like numeral on the page. For example, numeral 1 at 128 is connected to numeral 1 at 130, and not numeral 1 at 132. In addition, it is to understood that, if at any point, the time taken to input a complete code or response is greater than a predetermined time, the microprocessor 120 will immediately default to the default position 134 and the operator will have to re-input the security code.

The removable programming means 10 is turned on when, after it is plugged into the connection means 36, the "PROGRAM" key 60 is pressed. The microprocessor 120 is in the security mode and any code input via the numerical keys 58 will be checked against all acceptable security codes. If the code does not match any of the storage security codes, the removable programming means 11 turns off and waits for the "PROGRAM" key 60 to be pressed. If the security code is correct, the removable programming means 11 becomes functional and it is able to access the control means microprocessor 88.

The microprocessor 120 is able to operate in two different modes. The first mode, represented by the left-most branch in the flow chart in FIG. 5, beginning at branch point 136, adds additional access codes to the CMOS memory chip 92 given the total number of access codes does not exceed 200. If an existing access code is input, the removable programming means 11 is considered in the "MODIFY" mode wherein a new drawer assignment will be associated with the existing access code. An access code, when input into the electronic lock 12 of the storage assembly 14 allows selective access to the storage assembly 18. If the microprocessor 120 is signalled by the depression of the "YES" key 68 representing the access code has been properly entered, the microprocessor 120 receives the signals of the numerical keys 58 which are pressed representing the storage units 18 that may be opened when the access code is used. When the microprocessor 120 receives the signal from the "YES" key 68, signalling the completion of data entry, the microprocessor 120 sends all information, i.e., the new access code and the associate storage units 18 that may be accessed, to the control interface 118 where it will be sent to the control means microprocessor 88. The microprocessor 120 will display the new access code and accessible storage unit 18 numbers by sending a signal to display decoder 124 which will operate the display module 126. If a signal from the "PROGRAM" key 60 is received, the microprocessor 120 will return to branch point 136. If not, the removable programming means 10 will automatically return to default position 134.

The second mode of operation, represented by the right-most branch, beginning at branch point 136, in FIG. 5, is the verification mode. The microprocessor 120 automatically enters the verification mode when the "PROGRAM VERIFY" key 62 is pressed. The microprocessor 120 immediately sets a register counter X, as may be seen in block 138, to zero (0). The microprocessor 120 increments the value of X and checks the value of X (now one). If the value of X equals one more than the number of stored access codes, the microprocessor 120 returns to the branch point 136. If X is less than the number of stored access codes, the microprocessor 120 will direct the access code in register X to be displayed. The microprocessor always "knows" how many access codes are stored. If only 10 access codes are stored, only 10 access codes can be displayed (not 200). If the "DELETE" key 66 is pressed, the microprocessor 120 will send a signal to the control means microprocessor 88 to delete the access code and register X only after the "YES" key 68 has been pressed reaffirming the deletion. The "NEXT" key 64 may be sequentially pressed to scroll through all the registers by incrementing X and deleting those not needed.

A computer 115 may be in permanent communication with the control means 40. The computer 115 can perform all of the above-mentioned operations the removable programming means 11 may perform. The computer 115 is capable of deleting blocks of combined codes at a time. In addition, the computer may perform logging operations for logging which access codes have been used or attempted to be used.

Figure 6:
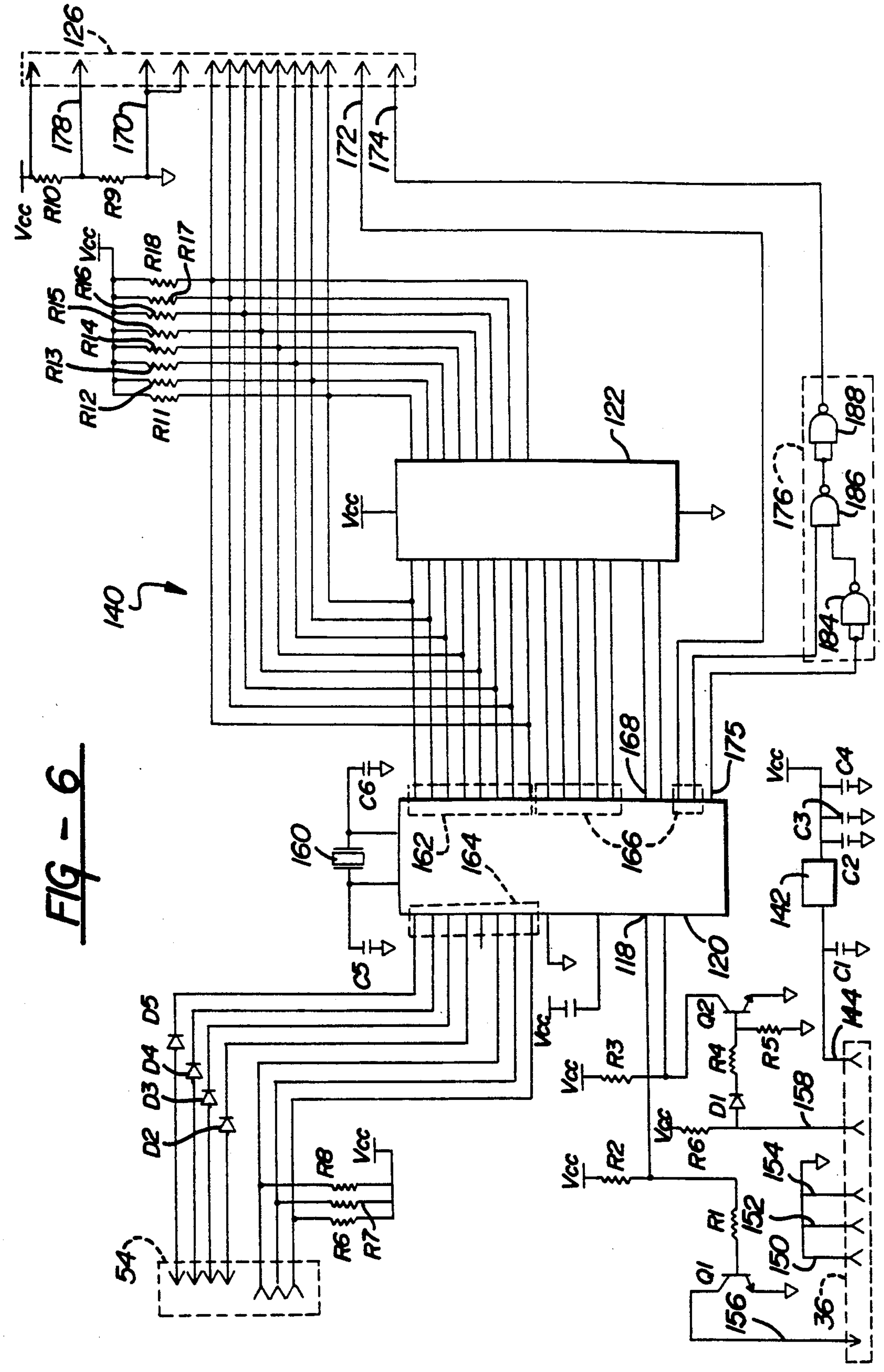
FIG. 6 is an electrical schematic of the subject invention.

A more detailed schematic of the circuitry, generally shown at 140, is shown in FIG. 6. In general, the downwardly pointed triangles are all connected to ground.

$V_{CC}$ is 5 volts DC and is produced by the power regulator 142, an LM7805 power regulator, and powers the whole circuit 140. The power regulator 142 receives 12 volts DC from the green wire 144 in the long telephone cord 36. The capacitor C1 is connected to ground and to the green wire 144 in parallel with the power regulator 142 and decouples the power as it is received by the circuit 130. The capacitor C2, C3 and C4 decouple the three integrated circuits 120, 122, 176, discussed in greater detail subsequently. The capacitor C2, C3, C4 are in parallel to each other and are connected between the output of the power regulator 142 and ground. Although not shown in the circuit 140, the capacitor C2, C3, C4 are placed in close proximity in their respective integrated circuits 120, 122, 176.

The black 150 and white 152 wires are used as grounds while the red wire 154 of the long telephone cord 38 is used to signal the control means 40 that the removable programming means 10 is present.

The remaining two lines, the yellow wire 156 and the blue wire 158 are indirectly connected to the microprocessor 120. Generally, the yellow wire 156 carries information from the removably programming means 10 to the control means 40 of the electronic lock 12 while the blue wire 158 carries information from the control means 40 to the microprocessor 120.

More specifically, the microprocessor 120 directs two transistors Q1, Q2 when communicating with the control means 40. The transistor Q1 is an open collector driver transistor wherein the collector is connected directly to the yellow wire 156, the emitter is connected directly to the ground, and the base is connected to a resistor $R_1$. The resistor $R_1$ is connected in parallel to the microprocessor 120 and a resister $R_2$. The resistor $R_2$ is connected in parallel to the resistor $R_1$ and the microprocessor 120. The resistor $R_2$ is also connected to $V_{CC}$. The transistor Q1 transmits serial data to the access control interface 118. The resistor $R_2$ is used to assist the sourcing capabilites of the output.

The microprocessor 120 is also connected in parallel to the transistor Q2 and to the resistor $R_3$. The resistor $R_3$ is also connected to $V_{CC}$. The collector of the transistor Q2 is connected to the microprocessor 120. The emitter of the transistor Q2 is connected to ground while the base is connected to two resistors $R_4$, $R_5$ which are parallel to each other. The resistor $R_5$ is connected to ground and the resistor $R_4$. The resistor $R_4$ is connected to the diode D1. The diode D1 is removably connected to the blue wire 158 and to the resistor $R_6$. The resistor $R_6$ is also connected to $V_{CC}$. The transistor Q2 is used as a serial input buffer. The open collector serial drive will transmit data by "sinking" current through the resistor $R_6$. This will pull the anode of diode D1 low. Because of the noise induced by and the resistive nature of the long telephone cord 38 between the access control interface 118 and the removeable programming means 10, this load cannot be guaranteed to be a logic 0. The diode D1 is used to add a threshold voltage to the base emitter junction of the transistor Q2. Now any serial input signal less than 1.4 volts will be recognizes as a logic 0 and will, therefore, turn off the transistor Q2. The resistor $R_3$ is the base bias resistor for the transistor Q2 and the resistor $R_5$ is used to ensure the turn off of the transistor Q2 when the diode D1 stops conducting with the low level input signal.

The microprocessor 120 is an INTEL number 80C31 microprocessor and it is used with an external EPROM chip 122 for program storage. This design was chosen to allow an easy software update. The microprocessor 120 has three ports; the first port 162 is port 0, the second 164 is port 1 and the third port 166 is port 2. The first port 162 interfaces both the display module 126 and the EPROM chip 122. The second port 164 interfaces the keyboard 54 and third port 166 interfaces the EPROM chip 122. The first port 162 is the address/data bus on the microprocessor 120. The address bits 0–7 appear on this bus on the first half of the bus cycle and are latched on the falling edge of the address latch enable clock 168. The EPROM chip 122 contains an address latch internal to itself. After the address latch enable 168 signal goes low, data bits 0–7 appear on the second half of the bus cycle. The bits are either directed to the display module 126 during a data write procedure or received from the EPROM chip 122 during an instruction read process.

The third port 168 contains the high order address bits 8–15. The bits 8–12 of this bus are directed to the EPROM chip 122 for high order addressing. The bits 13 and 14 are used for display module 126 control. All address latching is performed inside the EPROM chip 122.

The microprocessor 120 utilizes an 11.00 MHz crystal 160 because this oscillation frequency allows the microprocessor 120 to produce a 9600 BAUD rate for serial communications. The capacitors C5, C6 on either side of the crystal 160 are used to produce the needed 11.00 MHz frequency.

The keyboard 54 is connected to the second port 164 of the microprocessor 120. New access codes, and modes of manipulation, i.e. deletion, are sent to the microprocessor 120 via the second port 164. Bits 0–3 are used as row outputs and bits 4–6 are used as column inputs. Row outputs bits 0–3 are driven low and then high, sequentially. After each row output is driven low, column input bits 4–6 are read. If a key is pressed, a column input will be read as a logic low. The column number that is read and the row that is presently driven low will be recorded and compared to a look up table. The value of the pressed key can now be determined by using row and column values as pointers to this look up table.

The diodes D2, D3, D4, D5 are used to isolate row outputs from each other in the event that more than one key 56, 58 is pressed on the keyboard 54. The resistors $R_6$, $R_7$, $R_8$ are connected in parallel between $V_{CC}$ and the bit connections 5–7.

The first port 162, identified as port 0 by Intel, interfaces with both the display module 126 and the EPROM chip 122. The first port 162 data bits 0–7 drive the diplay data bus directly. The display module 126 is permanently placed into the write mode by tying its write enable line 170 low. A display pin 172 is the control/data selection signal and the state of this line determines the function of the data written to the display module. A logic 0 on this pin 172 will cause the data to be written into the display control register (not shown) and a logic one on this pin 172 will cause the data to be written to the display data buffer (not shown).

The display enable pin 174 is used to write data onto the display 52. The NAND integrated circuit, generally shown at 176, is used to decode the write signal. The NAND IC 176 is used to "AND" the inverted microprocessor 120 write signal with the address bit 172. Therefore, the display 52 will write only when the address bit is set to logic 1. The value at the WR pin 175 of the microprocessor 120 is NANDed with itself using NAND gate 184. The seventh bit of the third port 166 is NANDed with the output of the first NAND gate 184 using NAND gate 186. This output is NANDed with itself using NAND gate 188 where it is tied to the display enable pin 174.

The adjustment pin 178 adjusts the contrast of the display 52. The adjustment pin 178 is hardwired to two resistors $R_9$, $R_{10}$ wherein $R_9$ is connected between ground and pin 1 of the display module 126. The resistor $R_8$ is connected between the adjustment pin 178 and both the second pin of the display 126 and $V_{CC}$. The values for the resistors $R_9$, $R_{10}$ are chosen because its values are suitable for many display modules similar to that of the display module 126. In particular, these values work well with the display module 126 produced by SHARP.

$V_{CC}$ is also connected in parallel, through eight resistors $R_{11}$, $R_{12}$, $R_{13}$, $R_{14}$, $R_{15}$, $R_{16}$, $R_{17}$, $R_{18}$, with the display module 126, the zero port 180 of the EPROM chip 122, the A port 182 of the EPROM chip 122, and the first port 162 of the microprocessor 120.

In operation, the method of changing the access code of an electronic lock 12 for a storage assembly 14 having a plurality of storage units 18 and removable programming unit 10 would comprise the steps of: connecting the removable programming unit 10 to the storage assembly 14 via connection end 39 and connection port 46; entering the programming mode of operation by pressing any one of the mode keys 56 and altering the status of the plurality of access codes by entering the access code or numerals representing particular storage units 18 via the numerical keys 58. This method is characterized by removing the removable programming unit 10 from the proximity of the storage assembly 14 after completing operations. This may be done by removing the connection end 39 from the connection port 46 thus severing the mode of communication. This prevents any unauthorized alteration of status of the plurality of access codes which may be done inadvertently if the programming capability of the removable programming unit 10 were constantly present and in communication with the microprocessor 120 of the subject invention 10.

Figure 7:
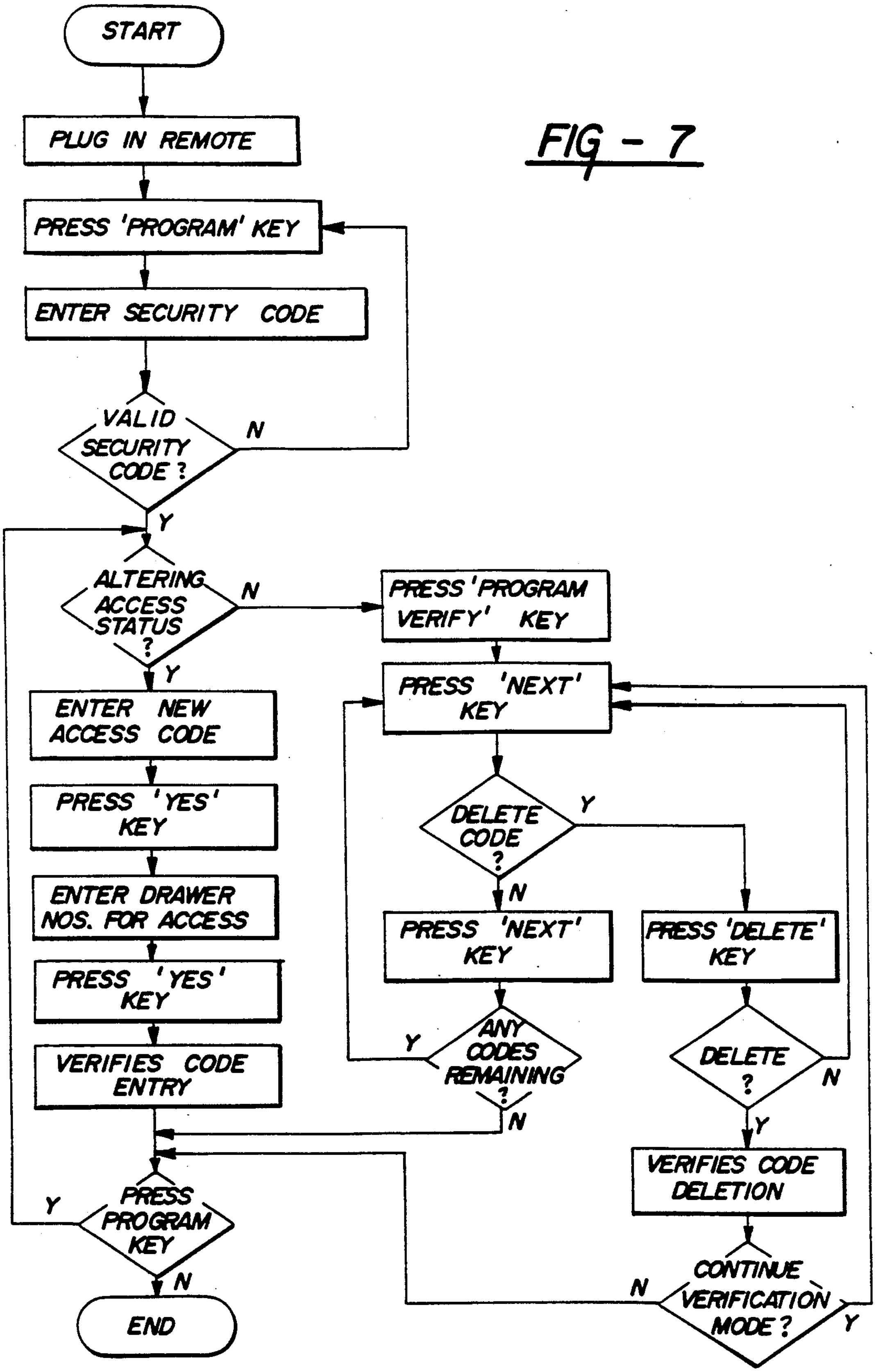
FIG. 7 is a flow chart of the operation of the removable programming means.

More particularly, the method of operation, shown in FIG. 7, begins with the operator connecting the long telephone cord 38 of the subject invention 10 to the control means 40 of the electronic lock 12 via the connection port 46. The "PROGRAM" key 60 is pressed to prepare the subject invention 10 to send the security code to the control means 40. 'ENTER SECURITY CODE' will appear on the display 52. If the security code is valid, 'ENTER SECURITY CODE' will appear and the operator will either add a new code or verify/delete an existing code. If the security code is incorrect, 'WRONG CODE TRY AGAIN' will appear on the display 52 and the operator must repress the "PROGRAM" key 60 and try again.

If a new access code is being added, it must be input at this point. Immediately following the new access code, the storage unit 18 numbers are to be inserted delineated by pressing the "YES" key 68. The display 52 will verify the new access code.

To modify the storage units 18 that may be accessed using an existing access code, the operator must input the existing access code as if it were a new access code. The storage units 18 may then be added in the same fashion as the storage units 18 for a new access code are entered, discussed above. In other words, the new assignment of storage units 18 will overwrite the old assignment of storage units 18.

If the operator wishes to verify or delete the code, the "PROGRAM VERIFY" key 62 must be pressed. The first access code i.e. the access code stored in register number 1 will be displayed. The "NEXT" key 64 may be repeatedly pressed until the desired code is reached. The "DELETE" key 66 is pressed followed by the "YES" key 68, as verification and the instruction to delete the access code is sent to the control means 40 where the access code is deleted from the control means CMOS memory chip 92. To continue through the list of access codes, the operator must begin pressing the "NEXT" key 64 again. When no more access codes exist, the message 'NO MORE ACCESS CODE ENTRIES' will appear in the display 52.

At any time throughout this method, the operator may redirect his search or mode of operation by pressing the "PROGRAM" key 60.

The invention has been described in an illustrative manner, and it is to be understood that the terminology which has been used is intended to be in the nature of words of description rather than of limitation.

Obviously, many modifications and variations of the present invention are possible in light of the above teachings. It is, therefore, to be understood that within the scope of the appended claims wherein reference numerals are merely for convenience and are not to be in any way limiting, the invention may be practiced otherwise than as specifically described.

What is claimed is:

1. A storage assembly (10) comprising:
housing means (16) defining an enclosure;
a plurality of storage units (18) to be supported by said housing means (16) for movement between a closed condition and an open condition;
individual locking means (44) each associated with one of said plurality of storage units (18) having a normally locked condition for independently locking each of said storage units (18) in said closed position and movable to an unlocked condition in response to an unlock signal for independently allowing each of said plurality of storage units (18) to move to said open position;
control means (40) connected within said housing means (16) for storing a plurality of stored access codes and for receiving input codes and for controlling said locking means (44) by producing said unlock signal when said input code matches one of said plurality of stored access code, said assembly (10) characterized by removable programming means (11) removably connectable with said control means (40) for selectively altering said plurality of stored access codes therein and disconnectable from said control means (40) for removal to a remote site for preventing the altering of said plurality of access codes.

2. An assembly (10) as set forth in claim 1 further characterized by said removable programming means (11) including removable input means (54) for inputting said plurality of stored access codes and a plurality of modes of operation into said control means 40.

3. An assembly (10) as set forth in claim 2 further characterized by said removable input means (54) including a push button keyboard.

4. An assembly (10) as set forth in claim 3 further characterized by said push button keyboard (54) including numerical keys (58) and mode keys (56) wherein said numerical keys (56) are for inputting said codes and said mode keys (56) are for selecting in which of said plurality of modes said removable programming means (11) is operating.

5. An assembly (10) as set forth in claim 4 further characterized by including display means (52) for displaying which of said numerical (58) and said mode (56) keys have been selected.

6. An assembly (10) as set forth in claim 5 further characterized by including connection means (36) for removably connecting said removable programming means (11) to said control means (40) of said storage assembly (16).

7. An assembly (10) as set forth in claim 6 further characterized by further including clip means (32) for removably attaching said removable programming means (11) to any one of said storage units (18).

8. An assembly (10) as set forth in claim 7 further characterized by further including retractable stand means (34) for positioning said removable programming means (11) away from said storage unit (18) when said removable programming means (11) is removably attached to said storage unit (18) via said clip means (32).

9. An assembly (10) as set forth in claim 8 further characterized by said removable programming means (11) being of a size suitable for holding said removable programming means (11) in an open hand.

10. A method for altering a plurality of access codes of an electronic lock (12) for a storage assembly (14) and a plurality of storage units (18) having a removable programming unit (11), the method comprising the steps of:

connecting the removable programming unit (11) to the storage assembly (14);

entering a program mode of operation;

altering a plurality of access codes;

the method is characterized by removing the removable programming unit (11) from the proximity of the storage unit to prevent any unauthorized alteration of the plurality of access codes.

11. A method as set forth in claim 10 further characterized by altering the plurality of access codes by adding an access code to the plurality of access codes.

12. A method as set forth in claim 10 further characterized by altering the plurality of access codes by deleting one of the plurality of access codes.

13. A method as set forth in claim 10 further characterized by altering the plurality of access codes by altering the quantity of storage units accessible by one of the plurality of access codes.

* * * * *